May 5, 1970 W. PEIL 3,510,679

HIGH SPEED MEMORY AND MULTIPLE LEVEL LOGIC NETWORK

Filed Oct. 26, 1966 3 Sheets-Sheet 1

INVENTOR:
WILLIAM PEIL,

BY [signature]
HIS ATTORNEY.

INVENTOR:
WILLIAM PEIL,
BY Marvin Goldenberg
HIS ATTORNEY.

INVENTOR:
WILLIAM PEIL,
BY Marvin Goldenberg
HIS ATTORNEY.

3,510,679

HIGH SPEED MEMORY AND MULTIPLE LEVEL LOGIC NETWORK

William Peil, Syracuse, N.Y., assignor to General Electric Company, a corporation of New York Filed Oct. 26, 1966, Ser. No. 589,722
Int. Cl. H03k *19/08, 19/22, 19/30*
U.S. Cl. 307—208 9 Claims

ABSTRACT OF THE DISCLOSURE

High speed, low power digital logic network for performing multiple level logic operations with memory at greatly improved speeds and with low power requirements. The network includes a bistable tunnel diode circuit, a source of clock signals and a multi-input logic gate circuit for generating logic signals in response to its applied inputs and said clock signals, said logic and clock signals being coupled to said tunnel diode circuit for driving said diode circuit into a first stable state with said clock signals solely applied and into a second stable state wtih said clock and logic signals applied concurrently.

The invention relates to high speed logic networks for performing Boolean logic of a digital, static type, i.e., wherein binary information bits of "1" and "0" are represented by a pair of discrete voltage levels. The invention, in particular is directed to a novel memory logic network capable of performing a number of multiple level logic operations with memory, such as combinations of OR-AND, and binary half adding, at speeds of from about 10 mHz. to several hundred mHz. The network can be employed as a building block in complex computer systems for performing essentially any complex mathematical operation. It includes a single tunnel diode element, exhibiting gain, memory and limiting properties, in combination with a plurality of semiconductor logic gates so as to obtain full advantage of the tunnel diode's capacity for a high speed and low power operation.

In recent years, with a vastly improved semiconductor technology and the development of wideband transistors, diodes and tunnel diodes, many forms of high speed semiconductor logic circuits have been made available. Included among these are different types of transistor logic gates for performing basic Boolean logic operations. In order to obtain complex logic functions, these logic gates are interconnected with transistor flip-flop components, or other conventional memory components, which typically include additional transistor gates. It is found that for performing the memory functions, transistor logic circuitry is of greatest advantage, i.e., provides the optimum speed-power product, when operating at moderate speeds, for example less than 10 mHz. operating frequency. As the speed is increased, for example to around 50 mHz., the power required to perform the memory functions increases drastically. This is due partially to the capacitive parasitics associated with transistor devices and partially to the finite gain-bandwidth product of transistors.

Tunnel diode logic gates have also been developed for performing basic Boolean logic operations, which are inherently faster acting than transistor gates. Although tunnel diode circuits have appreciably extended the speed of operation over transistor logic gates, they possess limitations with respect to both speed and power when performing a multiple level logic operation. When performing several levels of logic, a sequential clocking must be employed with a clock signal required for each level. Thus, the frequency at which a multiple level logic operation can be performed is inherently $n$ times less than the frequency at which a single logic operation can be performed, where $n$ is the number of logic levels. Further, relatively appreciable amounts of power are consumed at each level in the application of the clock signals.

It is accordingly an object of the invention to provide a novel memory logic network employing a tunnel diode device, which networks exhibits both the high speed and low power properties for which the tunnel diode has an inherent capability A further object of the present invention is to provide a novel memory logic network which is capable of performing multiple level logic operations with speed-power products greatly superior to that attainable employing conventional logic circuitry.

Another object of the invention is to provide a novel memory logic network as described which employs semiconductor logic gates for performing part of the logic and also for establishing the requisite isolation between input and output of the tunnel diode.

Yet a further object of the invention is to provide a novel memory logic network as described wherein gain may be provided both by said logic gates and said tunnel diode, or merely by the tunnel diode.

Yet another object of the invention is to provide a novel memory logic network as described wherein the tunnel diode simultaneously provides both a memory and a logic function.

It is still a further object of the invention to provide a novel memory logic network as described employed as a building block from which circuitry can be constructed for performing numerous complex logic operations.

In accordance with these and other objects of the invention, there is provided a high speed, low power digital logic network for performing a two level logic operation with memory, which basically includes a bistable tunnel diode circuit, a multi-input logic gate circuit, a source of clock pulses and an output circuit. The logic gate circuit includes a plurality of logic gates for performing a number of different basic logic operations, typically AND and OR operations. In response to a clock pulse, said logic gate circuit generates an output to the tunnel diode circuit in accordance with the input conditions and the logic performed, which takes the form of a pulse or absence of a pulse. The clock pulse is simultaneously applied to the tunnel diode circuit with a polarity opposite to that of the output pulse from said logic gate circuit and a magnitude about one-half of that of said output pulse. With only the clock pulse applied to the tunnel diode circuit, the tunnel diode will be driven into one voltage state, and with both the output pulse in the logic gate circuit and the clock pulse applied, the tunnel diode will be driven into its other voltage state. The output circuit responds to the state in which the tunnel diode is in and provides a pair of complementary outputs.

In accordance with one specific embodiment of the invention, the logic gate circuit includes a first and second transistor logic gate operating in a current mode, each gate comprising a pair of emitter connected input transistors and a reference transistor coupled with said input transistors to provide a current steering mode logic and having connections both to said clock source and to said tunnel diode. In response to an input causing conduction in at least one of the emitter connected input transistors, the associated reference transistor will be inhibited from conducting. With neither transistor conducting, the clock pulse determines the voltage state of the tunnel diode. In the alternate operation, with inputs applied so that at least one of the reference transistors conducts, a pulse is supplied from the logic gate circuit which overrides the clock pulse and places the diode in the opposite voltage condition.

In accordance with a still further aspect of the described memory logic network, means are provided in the common current path of the input and reference transistors which limits the time in which current is supplied by the logic circuit to the tunnel diode. Said means further prevents a race condition from developing when several memory logic networks are interconnected and driven from a common clock source.

The specification concludes with claims particularly pointing out and distinctly claiming the subject matter which is regarded as the invention. It is believed, however, that both as to its organization and method of operation, together with further objects and advantages thereof, the invention may be best understood from the following description taken in connection with the accompanying drawings in which:

Figure 1:
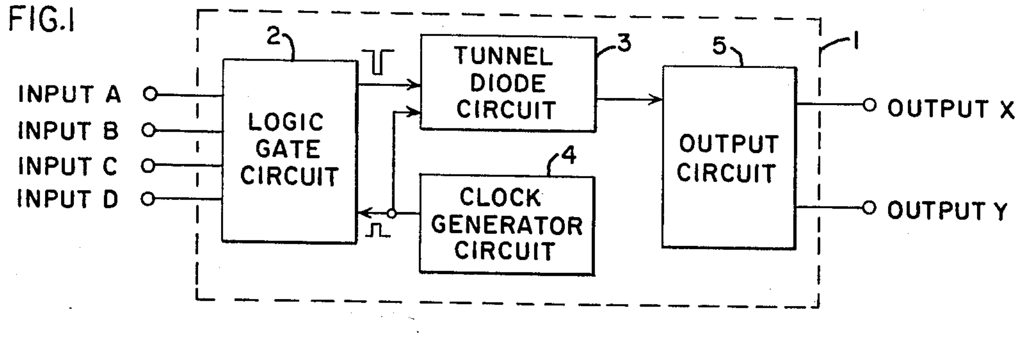
FIG. 1 is a schematic block diagram of a single memory logic network in accordance with the invention.

Referring to FIG. 1, there is illustrated a schematic block diagram of a logic memory network in accordance with the invention, capable of deriving a number of two level logic functions at speeds up to and beyond several hundred mHz. and with low power requirements. For example, in one specific operating embodiment of the invention, as low as 10 milliwatts of power were consumed by the network at an operating speed of 100 mHz. Network 1 includes a logic gate circuit 2, a tunnel diode circuit 3, a clock generator circuit 4 and an output circuit 5. The logic gate circuit 2 performs various basic Boolean logic operations, typically AND and OR operations. The circuit 2 also acts to provide isolation between the tunnel diode and the input terminals of network 1. Significantly, the tunnel diode circuit 3 performs a portion of the overall logic as well as provides a memory function. A plurality of inputs for network 1 are applied to logic gate circuit 2. The number of inputs employed is a function of the logic being performed. In one exemplary embodiment illustrated there are four input terminals, A, B, C, and D. A pair of complementary outputs are provided at output terminals X and Y, which are coupled to the output circuit 5.

An output from clock generator circuit 4 supplies a clock pulse of given polarity to the tunnel diode circuit, which pulse by itself is capable of switching the tunnel diode to one of its voltage states, typically to the low voltage state. A further output from clock generator circuit 4 simultaneously supplies the clock pulse to the logic gate circuit 2. A connection is made from circuit 2 to the tunnel diode circuit 3, which, in response to the applied clock pulse, carries to the tunnel diode a pulse or absence of a pulse as a function of the logic that is performed. The pulse applied to the tunnel diode from circuit 2 is of opposite polarity to the applied clock pulse and of approximately twice the magnitude. Thus, when present, it overrides the clock pulse and is determinative of the state to which the tunnel diode is driven. The tunnel diode circuit 3 is connected to the output circuit 5.

The latter circuit provides complementary output voltages indicative of the tunnel diode state, as well as providing isolation between the tunnel diode and the output terminals X and Y.

Consider one exemplary operation of the network 1 where a double OR-AND operation is performed. This may be expressed in Boolean notation as follows:

$$Y=(A+B)(C+D)$$

For example, with a binary "1" applied to either or both of input terminals A or B and to either or both of input terminals C or D, a "1" output is caused to appear at output terminal Y. In one manner of accomplishing such operation, the logic gate circuit 2 is inhibited from generating a pulse in response to the clock pulse. Thus, upon being applied to the tunnel diode, the clock pulse drives it into its low voltage state and thereby provides a "1" output at terminal Y. For the converse operation, i.e., a double AND-OR operation, the Boolean notation is as follows:

$$\overline{Y}=(\overline{A})(\overline{B})+(\overline{C})(\overline{D})$$

In this case with a binary "0" applied either to both terminals A and B or to both terminals C and D, or to all four input terminals, the logic gate circuit 2 applies an output pulse to the tunnel diode in response to being clocked, which pulse drives the tunnel diode into its high voltage state and provides a "0" output at terminal Y.

Figures 2, 3:
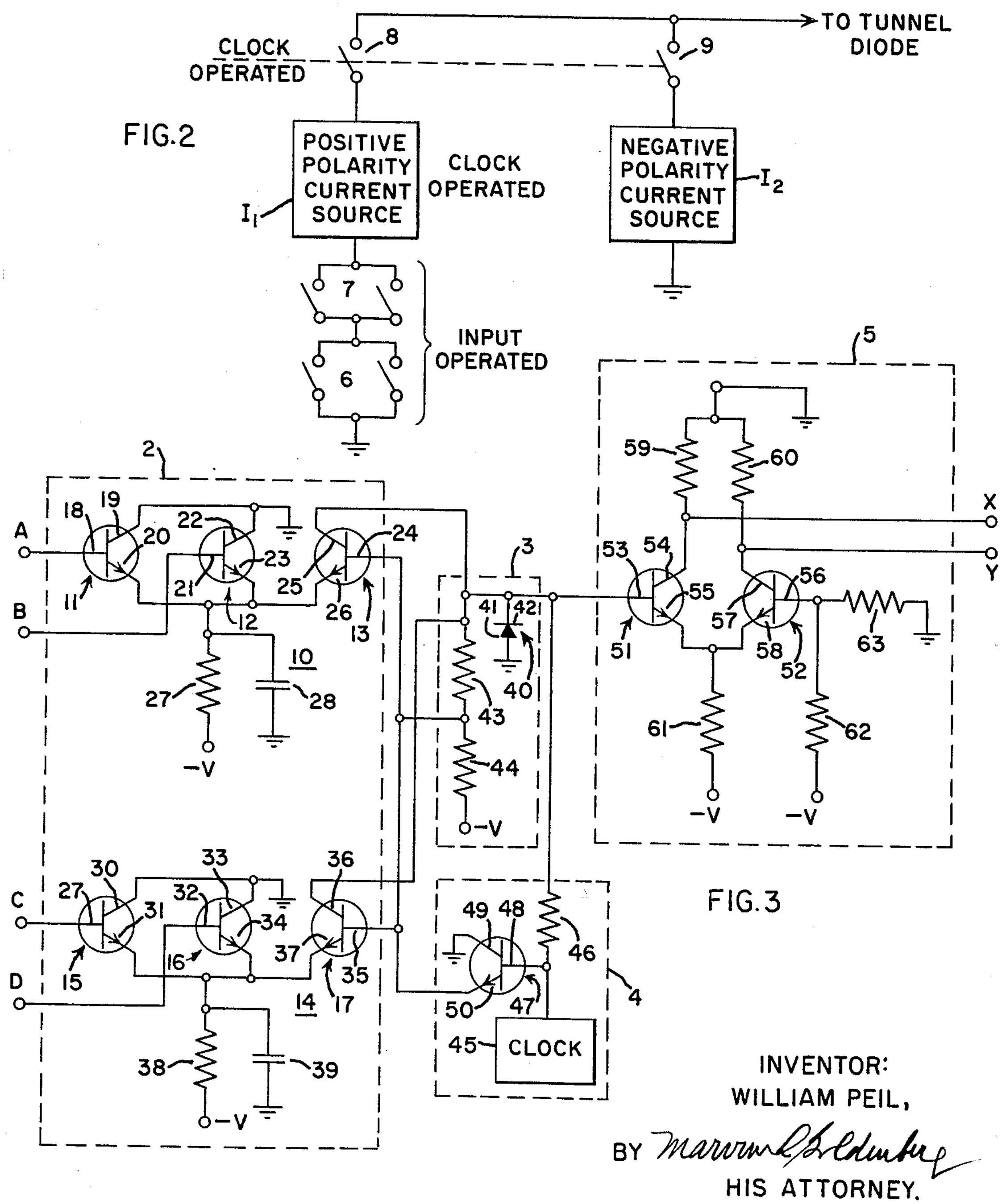
FIG. 2 is a schematic diagram illustrating an electromechanical relay analog of the logic gate circuit shown in FIG. 1.
FIG. 3 is a schematic circuit diagram of one preferred embodiment of the invention following the block outline of FIG. 1.

As previously noted, the logic gate circuit 2 may be, per se, a conventional component for performing one or more basic Boolean logic operations. In FIG. 2 the logic is shown to be performed by electro-mechanical relay elements 6 and 7, which are known to be the analog for any conventional electrical logic elements. Relay elements 6 and 7, which are input operated, are serially connected between one side of a positive polarity current source $I_1$ and ground. The other side of source $I_1$ is connected through a relay 8 to the tunnel diode circuit. A negative polarity current source $I_2$ of half the magnitude of $I_1$ is connected at one side to ground. The other side is connected through relay 9, which is ganged to relay 8, to the tunnel diode circuit. Relays 8 and 9 are operated in unison by a clock action. The operation of the illustrated circuit is analogous to that previously described with respect to FIG. 1.

It may be appreciated that the basic logic operations performed by the electro-mechanical relay components 6 and 7 in their application to the present invention can be performed by numerous conventional logic elements, which in addition to transistor logic may include diode logic and multiple emitter transistor logic. However, a current mode transistor logic is considered to be preferable for the present application because of its speed, gain and isolation properties.

In FIG. 3, there is illustrated a schematic circuit diagram of one preferred embodiment of the memory logic network 1 which employs current mode transistor logic. Although not shown specifically, it should be understood that at typical operating speeds, a distributed transmission system is utilized. Accordingly, the logic gate circuit 2 includes a first logic gate 10 comprising a pair of emitter coupled input transistors 11 and 12 and a reference transistor 13 operated in a current steering mode, and a second logic gate 14 comprising a further pair of emitter coupled input transistors 15 and 16 and reference transistor 17, which transistors similarly are operated in a current steering mode. An approximately fixed current is conducted by the transistors of each logic gate, which current is steered as a function of the input signals applied to the input transistors in combination with a reference signal applied to the associated reference transistor. Accordingly, within each logic gate the current is conducted either by one or both of the input transistors or by the reference transistor.

Transistor 11 has a base 18, a collector 19 and an emitter 20; transistor 12 has a base 21, a collector 22 and an emitter 23; and transistor 13 has a base 24, a collector 25 and an emitter 26. Input terminal A is connected to base 18, and input terminal B is connected to base 21. Collectors 19 and 22 are commonly connected to a ground. Emitters 20, 23 and 26 are joined together and connected through a common emitter resistor 27 to a source of potential —V. Connected across resistor 27 to ground is a capacitor which, as will be explained in greater detail, provides a further power savings in the operation as well as prevents a race condition from developing when a plurality of networks are interconnected.

Transistor 15 has a base 29, a collector 30 and an emitter 31; transistor 16 has a base 32, a collector 33 and an emitter 34; and transistor 17 has a base 35, a collector 36 and an emitter 37. Input terminal C is connected to base 29 and input terminal D is connected to base 32. Collectors 30 and 33 are commonly connected to ground. Emitters 31, 34 and 37 are joined together and connected through an emitter resistor 38 to source —V. A capacitor 39 is connected across resistor 38 to ground and functions similarly to capacitor 28.

The tunnel diode circuit 3 includes a tunnel diode device 40 having an anode 41 and a cathode 42, and a pair of load resistors 43 and 44. Anode 41 is connected to ground and cathode 42 is connected through serially coupled resistors 43 and 44 to source —V, and also to the collector electrodes 25 and 36 transistors 13 and 17.

The clock generator circuit 4 includes a source of clock pulses 45, a current limiting resistor 46 and a clock driver transistor 47, including a base 48, a collector 49 and an emitter 50. In one operating embodiment the clock source 45 was a conventional component generating positive voltage pulses of approximately a five nanosecond pulse width at a frequency of 100 mHz. The output from clock source 45 is connected through resistor 46 to the tunnel diode anode 42 for coupling the clock pulses to the tunnel diode. The output from source 45 is further connected to base 48 of transistor 47. Collector 49 is connected to ground and emitter 50 is connected to the junction of resistors 43 and 44 and to the base electrodes of transistors 13 and 17. By means of the above described circuit connections the clock pulses are applied to the logic gate circuit 2.

Output circuit 5 includes a pair of emitter connected output transistors 51 and 52 which operate in a current steering mode. Transistor 51 has a base 53, collector 54 and emitter 55. Transistor 52 has a base 56, a collector 57 and an emitter 58. Collector 54 is connected through a biasing resistor 59 to ground, and collector 57 is connected through a biasing resistor 60 to ground. Emitters 55 and 58 are joined together and connected through an emitter resistor 61 to source —V. The cathode of tunnel diode 40 is connected to the base 53. Base 56 is connected to the junction of biasing resistors 62 and 63, which resistors are serially connected by the source —V and ground and provide a potential division. Output terminal X is connected to the collector 54, and output terminal Y is connected to collector 57 to provide a pair of complementary output voltage levels of uniform magnitude.

The network 1 of FIG. 3, in addition to deriving a double OR-AND function and a double AND-OR function, is capable of providing numerous variations that can be made of such logic functions, e.g., binary half-adding. As will be seen when considering FIG. 7, the network also may be employed in a shift register operation. Further, although illustrated as having two transistor logic gates with two static inputs per gate, the network 1 can be readily expanded to include additional logic gates, as well as additional input transistors per gate, for extending the logic operation performed.

For purposes of explanation, a typical operation will be considered in which a double OR-AND function is generated. In the generation of a digital, static type logic, a pair of discrete voltage levels are employed for the representation of a binary "1" and a binary "0." In the design of the circuit under consideration, these voltages have about a 400 millivolt separation, with the higher voltage level being at ground. For illustration, the higher voltage level may be said to correspond to a binary "1" and the lower voltage level to a binary "0." Once the design of the circuit is fixed for the indicated voltage levels, or whatever levels are employed, it is important that these levels be established at both output terminals of the network so as to be available as inputs to other interconnected networks.

As has already been stated, when the input conditions of double OR-AND are satisfied, a "1" will appear at the output terminal Y. Since the outputs provided are complementary, a "0" will appear at terminal X. For the operation being considered, however, only terminal Y is employed for providing the output. Conversely, when the above described input condition is not satisfied a "0" appears at terminal Y and a "1" appears at terminal X. The latter logic is in fact tantamount to a double AND-OR function.

The operation of the circuit of FIG. 3 will be described with reference to the series of graphs shown in FIG. 4 wherein the voltage waveforms at a number of points in the circuit are schematically represented for several exemplary logic sequences. In logic sequence 1, it is assumed that a binary "1" is applied to input terminal A and a "0" is applied to input terminal B, as shown in graphs *a* and *b* of FIG. 4. Typically, these voltages are ground and minus 400 millivolts, respectively. Transistor 11 is then conducting and transistor 12 is nonconducting so that all of the current is steered through transistor 11. The emitter voltage level of the first logic gate is a several hundred millivolts below that of the conducting transistor base voltage, in this case the input to terminal A, and is shown in graph *c*. For the operation being considered, the emitter voltage is typically minus 750 millivolts. Binary "1" and "0" inputs are also applied to input terminals C and D, respectively, as shown in graphs *e* and *f*, so that the current in the second logic gate 14 is steered through transistor 15. The emitter voltage level of logic gate 14 is shown in graph *g*.

The tunnel diode provides storage with respect to the previous logic sequence. As shown in graph *j*, the tunnel diode is assumed to be in its low voltage state so as to provide storage of a "0" output from output terminal X and a "1" output from output terminal Y, as shown in graphs *k* and *l*. With the tunnel diode in its low voltage state, the base 53 of output transistor 51 is biased sufficiently positive with respect to the fixed bias applied to base 56 that transistor 51 conducts and transistor 52 is cut off.

Figure 5:
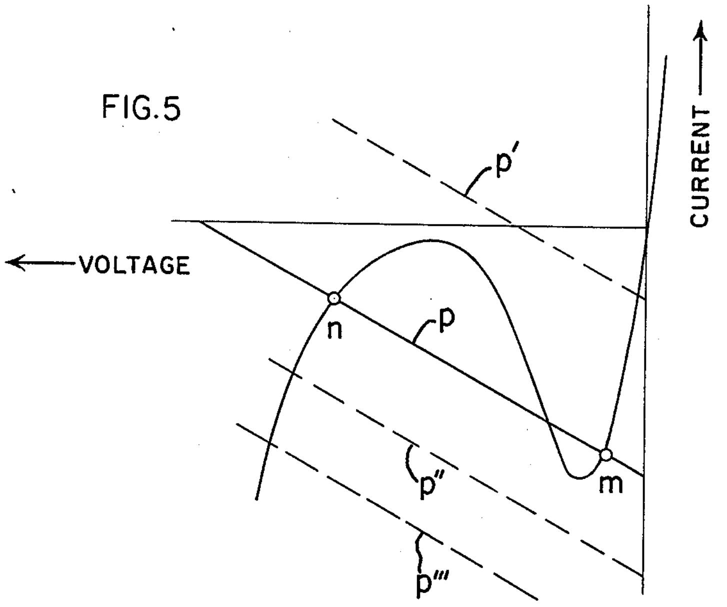
FIG. 5 is a graph illustrating the voltage vs. current characteristics of the tunnel diode circuit of FIG. 3.

In FIG. 5 is shown the voltage vs. current characteristics for the tunnel diode circuit. The tunnel diode is loaded by the resistor 43, with the bias voltage established at the junction of resistors 43 and 44, to provide a bistable operation of the diode. The low and high voltage stable operating points are at *m* and *n*, respectively, in FIG. 5. The load line *p* is given for the condition in which the clock pulse is not present. When considering the bistable operation of the tunnel diode, it is significant that there be a large enough differential in the forward voltage drop for high and low voltage conditions to support signal swings at the output which are adequate for distinguishing information bits. In the present case the specific requirement is to control the conduction of transistors 51 and 52 so as to steer current through one or the other as a function of the tunnel diode operating state. In addition, the forward voltage drop in the high voltage state should be small enough so as to prevent the reference transistors of the logic gate circuit from saturating during conduction. In the exemplary operation under consideration, the differential in forward voltage drop should be at least 400 millivolts, with the high voltage drop being no greater than about 600 millivolts.

At the end of logic sequence 1, at time $t_1$, a clock pulse is generated for performing the indicated double OR-AND logic function with respect to the inputs existing at this time. As shown in graph *i*, the clock pulses are positive spikes, which are of approximately 600 millivolts amplitude in the example being considered. During the clock standby periods, the voltage level of the output from clock source 45 is at ground. As the clock pulse is applied, the voltages at the base electrodes 24 and 35 of reference transistors 13 and 17 are seen to rise from a highly negative voltage to a voltage slightly below ground, as shown in graphs *d* and *h*, respectively. For the operation being considered, the voltages at these base electrodes are typically at minus 750 millivolts during clock standby, rising to minus 150 millivolts in the presence of the clock pulse. Since, at this time, input terminals A and C have "1's," or ground potential applied thereto, reference transistors 13 and 17 are prevented from conducting.

Figure 6:
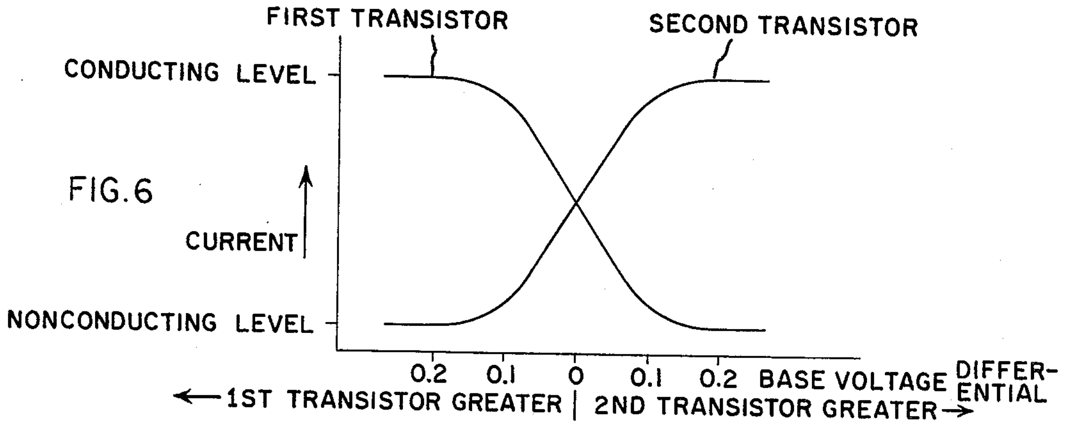
FIG. 6 is a graph illustrating voltage vs. current characteristics of two transistors in a current steering operation.

FIG. 6 illustrates the voltage vs. current characteristics for a first transistor and a second transistor connected in a current steering mode, where these transistors may be both the input transistors, may be both output transistors, or where the first may be an input transistor and the second a reference transistor. The base voltage differential between the two transistors is plotted versus current. It is seen that where the first transistor has a base voltage sufficiently higher than the second transistor, it conducts essentially all of the current. Conversely, where the second transistor has a base voltage sufficiently higher than the first transistor, it conducts essentially all of the current. For the operation being considered, the units indicated in FIG. 6 are typically in volts.

Accordingly, with the base electrodes of input transistors 11 and 15 at ground potential and the base electrodes of reference transistors 13 and 17 at minus 150 millivolts, the reference transistors cannot conduct. Tunnel diode 40 has only the clock pulse applied. In essence, this shifts the load line P to position P′ so that the diode is driven further into its low voltage state, the operating point returning to *m* upon cessation of the clock pulse. Accordingly, the output voltages at terminals X and Y remain as they were.

In logic sequence 2, it is assumed that the input to terminal A goes to "0," as shown in graph *a*. For this input condition, in put transistors 11 and 12 are both partially conducting and the current flowing in the circuit is therefore shared by the transistors. The emitter voltage level of logic gate 10 decays exponentially to a more negative voltage level, as shown in graph *c*. The decay is caused primarily by the charging of capacitor 28 by source −V, and the decay time is thereby a function of the RC time constant of the circuit, in particular, the values of resistor 27 and capacitor 28. It is necessary that the period between clock pulses be at least one and preferably two or three RC time constants so that the emitter voltage level is properly established.

It is noted that during logic sequences 1 and 2, the inputs to terminals C and D do not change and the emitter voltage level for logic gate 14 remains constant.

In response to the clock pulse at the end of logic sequence 2, at time $t_2$, the voltages at base electrodes 24 and 35 of the reference transistors are again raised. Because the voltage at base 24 becomes sufficiently higher than the voltage at the base electrodes of the input transistors 11 and 12, transistor 13 assumes the conduction mode and both transistors 11 and 12 become nonconducting. In response to the current conduction occurring through transistor 13, the tunnel diode 40 switches to its high voltage state, as shown in graph *j* of FIG. 4. This is also indicated in FIG. 5 by the load line shifting to position P″ and the operating point switching to *n* upon cessation of the clock pulse. At about the same time, the output a terminal X switches to a "1" voltage level and the output at terminal Y switches to a "0" voltage level due to the output transistor 51 being turned off and output transistor 52 becomes conducting.

Figure 4:
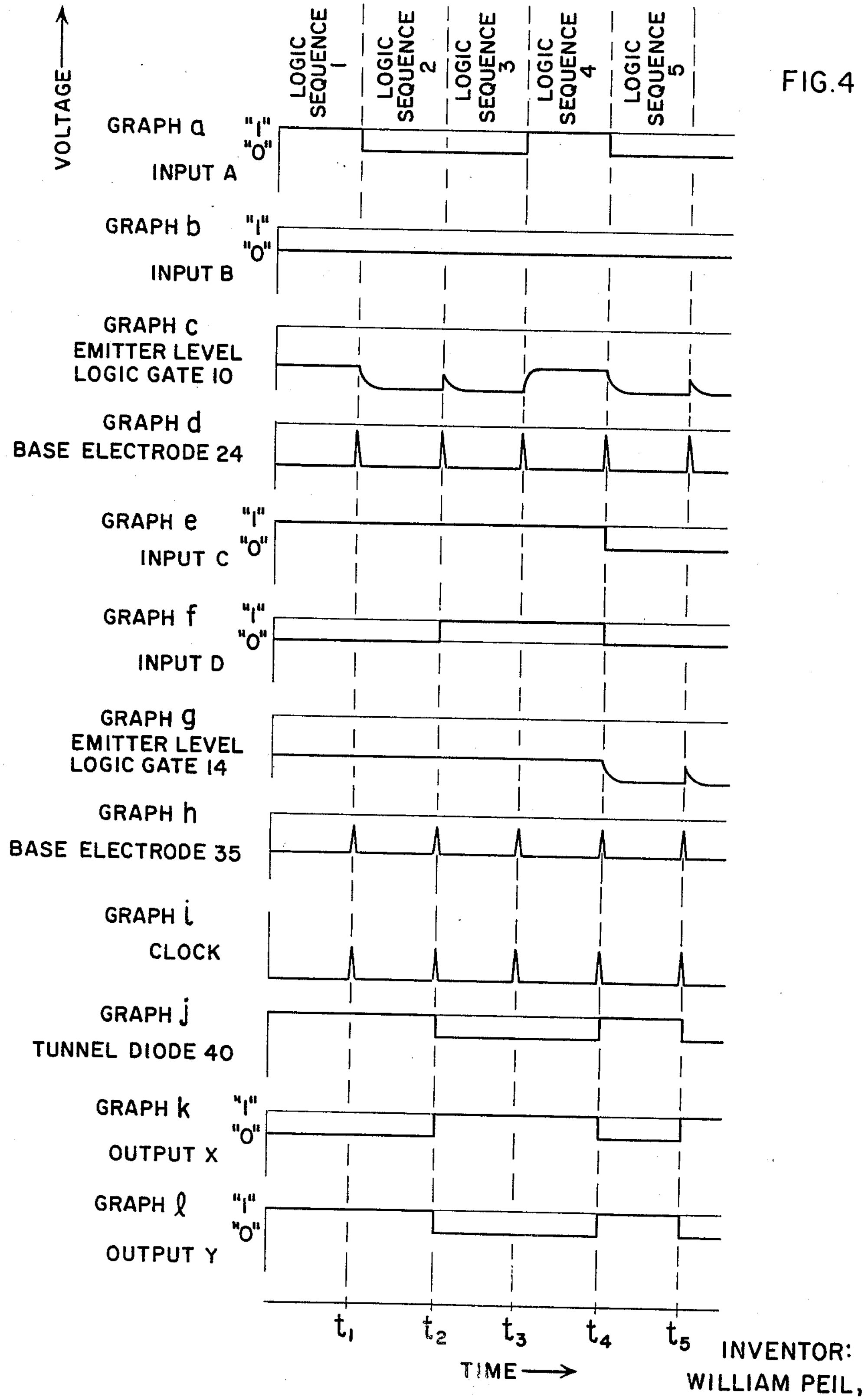
FIG. 4 is a series of graphs presenting various waveforms applicable to the circuit of FIG. 3 which are employed in a description of the circuit.

The conduction through the tunnel diode discharges the capacitor 28 and the emitter voltage abruptly rises to a less negative potential, as shown in graph *c* of FIG. 4. The connection of the shunt capacitor 28 reduces the signal current required for switching the tunnel diode and thereby provides a power savings since a surge of current for switching the tunnel diode is permitted to flow only long enough for the capacitor to be discharged. Since the capacitor is of very small value the time for discharging it is extremely short. Once the tunnel diode is switched and the capacitor is discharged, current limiting is provided by the emitter resistor 27.

The emitter capacitor 28 is of further value in that it prevents a race condition from developing. Since the network illustrated in FIG. 3 is normally employed in multiple form in combination with synchronous clocking, it is possible for the inputs to change at essentially the same time the clock signal is applied. It is a requirement of the circuit that the inputs present just prior to he clock pulse be effective in the performance of the logic. If the inputs are changing during the application of the clock pulse, the circuit should not respond to such changes. Such a response leads to a race condition and cannot be tolerated. The capacitor 28 functions to avoid a race condition from developing by introducing a delay into the circuit. For example, considering again what occurs at time $t_1$. During application of the clock pulse, should the input terminal A change to "0," the emitter voltage level would not rapidly follow this change, but rather it requires some finite time for the capacitor to be charged to the new negative voltage level. Thus, with the capacitor not yet in its charged condition, any tendency for the reference transistor 13 to conduct would not result in the large current surge required for switching the tunnel diode.

Upon termination of the clock pulse, reference transistor 13 again becomes nonconducting and current is steered back to be shared by transistors 11 and 12. The emitter voltage is returned to its more negative potential by the charging of capacitor 28.

In logic sequence 3 it is assumed that the input to input terminal D changes to a "1" value so that both input transistors 15 and 16 now share conduction of the current. This does not change any other portion of the operation. The emitter voltage level of the second transistor gate 14 remains essentially unchanged and the reference transistor 17 still may not conduct.

At the end of the logic sequence 3, at time $t_3$, generation of the clock pulse again causes reference transistor 13 to conduct, in the same manner as previously explained. Tunnel diode 40 remains in its high voltage state and the output at terminals X and Y remain unchanged.

In logic sequence 4 it is assumed that the input to terminal A again returns to a binary "1," shown in graph *a*, all of the current again being steered through transistor 11. Accordingly, upon the reference transistor 13 returning to its nonconducting state, the emitter level voltage will exponentially rise to its less negative potential. The exponential rise occurs through a discharge of the capacitor 28 which occurs by conduction through transistor 11.

At the end of logic sequence 4, at time $t_4$, generation of the clock pulse cannot cause either of reference transistors 13 or 17 to conduct. The tunnel diode is driven into its low voltage state and the outputs at terminals X and Y change to "1" and "0," respectively.

In logic sequence 5 all inputs go to "0." For such condition both reference transistors 13 and 17 conduct upon generation of the clock pulse. Thus, at time $t_5$ the tunnel diode is driven into its high voltage state. As shown in FIG. 5, the load line is shifted to position P‴ during application of the clock pulse, the operating point switching to $n$ upon its termination. It is noted that due to the voltage limiting property of the tunnel diode, the voltage across the diode during conduction of two reference transistors is essentially the same as during conduction of one.

For purposes of simplicity only a limited number of input conditions helping to best explain the various aspects of the operation of the circuit of FIG. 2 have been considered. It may be appreciated that the described operation applies equally to any other combination of inputs that may be made.

In one exemplary operable embodiment of the described network, the following circuit components and parameters were used, being presented for purposes of illustration and not to be construed as limiting.

Capacitors 28 and 29—15 picofarads
Resistors 27 and 38—330 ohms
Resistors 43, 44 and 46—1 kilohm
Resistor 59—150 ohms
Resistors 60, 61 and 63—200 ohms
Resistor 62—2 kilohms
Transistors 11, 12, 13, 15, 16, 17, 47, 51 and 52—Type 2N918
Tunnel Diode 40—Type 1N3713
Voltage Source —V—1.5 volts It may be appreciated that in the above described network, the tunnel diode performs several functions with great advantage. It serves as a single input logic component, performing both AND and OR operations. In the functioning of the network, this logic operation is performed essentially instantaneously so that the two level logic of the instant network is accomplished in approximately the same time it takes transistor circuitry to perform a single level logic. The voltage limiting or clamping property of the tunnel diode in its high voltage state is an important factor in obtaining the described operation. Accordingly, because the forward voltage drop across the tunnel diode does not change significantly for a fan-in of one or several inputs, reference transistors 13 and 17 are prevented from entering saturation for the logic condition in which both transistors are conducting.

The tunnel diode also functions as a single input memory device wherein set and reset signals can be simultaneously applied, in the present application these signals corresponding to those generated by the clock circuit and the logic gate circuit. In addition to offering appreciable power savings over conventional transistor memory circuits, normally in the form of plural input flip-flop circuits, a speed advantage is obtained. This is due to the fact that in convention flip-flop set and reset signals must be applied in sequence.

Figure 7:
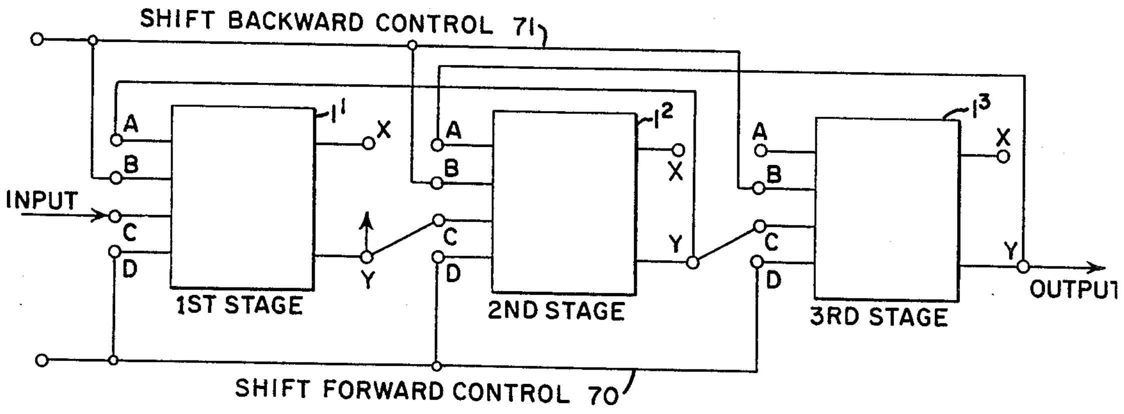
FIG. 7 is a block diagram of several memory logic networks interconnected to provide a three stage reversible shift register, and illustrating one exemplary application of said logic network.

In FIG. 7 there are illustrated several memory logic networks 1[1], 1[2] and 1[3], each of the type described with respect to FIG. 3, which networks are interconnected so as to provide a three stage shift register operation employing negative logic. It should be recognized, however, that numerous combinations of the memory logic network may be made by those skilled in the art for providing an essentially unlimited number of logical operations, the instant shift register embodiment being described as only a single exemplary embodiment. The memory logic networks of each stage of the reversible shift register include both a forward and a backward shift register component. The first logic gates of each network with input terminals A and B provide the backward shift register operation, and the second logic gates of each network with input terminals C and D provide the forward shift register operation.

In the first stage an input to be shifted in the forward direction is applied to terminal C of network 1[1]. The output of network 1[1] appearing at its output terminal Y is connected to the input terminal C of network 1[2]. The output terminal Y of network 1[2] is similarly coupled to terminal C of network 1[3]. A shift forward control from bus

70 is applied in each stage to terminal D of networks 1[1], 1[2] and 1[3]. The output for the overall forward shift register operation is taken from terminal Y of network 1[3]. For shifting in the backward direction, terminal Y of network 1[3] is coupled to terminal A of network 1[2]. Applied to terminal A of network 1[1] is the output from terminal Y of network 1[2]. A shift backward control from bus 71 is applied to terminal B of each of networks 1[1], 1[2] and 1[3]. In the backward operation, output terminal Y of network 1[1] supplies the output of the overall shift register.

For a forward shift register operation, the shift forward control bus 70 is energized and only that portion of the networks are made operable. For a backward shift register operation, the shift backward control bus 71 is energized so that only that portion of the networks are in operation. The operation of the individual networks is otherwise as previously discussed.

Although the invention has been described in detail with respect to a specific exemplary embodiment for purposes of clear and complete disclosure, it is noted that numerous modifications can be made to the circuit which would not exceed the basic teachings presented. Accordingly, the appended claims are intended to include within their ambit all modifications and variations that fall within the true scope of the invention.

What I claim as new and desire to secure by Letters Patent of the United States is:

1. A multiple level logic network comprising:
(a) a single input bistable memory means,
(b) first logic means having applied thereto a plurality of binary inputs for generating a first signal or absence thereof as a function of said inputs,
(c) second logic means for generating a second signal independent of said inputs,
(d) means for coupling said second signal to said first logic means wherein said first logic means is responsive to the application of both said inputs and said second signal,
(e) means for coupling said first signal to the input of said memory means for driving it into a first stable state, and
(f) means for coupling said second signal to the input of said memory means concurrent with the coupling of said second signal to said first logic means for driving said memory means into a second stable state in the absence of said first signal, said first signal taking precedence over said second signal for driving said memory means into the first stable state when both signals are present at the memory means input.

2. A logic network as in claim 1 wherein said first signal is of a given polarity and magnitude and said second signal of a polarity opposite to said given polarity and a magnitude substantially less than said given magnitude.

3. A logic network as in claim 2 wherein said second logic means includes a clock generator for generating said second signal as periodic clock signals.

4. A logic network as in claim 3 wherein said first logic means includes at least one current mode operated logic gate which in addition to performing logic acts as a buffer between said memory means and said inputs.

5. A logic network as in claim 4 wherein said memory means includes a tunnel diode device.

6. A logic network as in claim 5 wherein said logic gate includes a plurality of emitter coupled transistors, at least two of which are input transistors controlled by said inputs and one of which is a reference transistor controlled by said second signal, said reference transistor being coupled to said tunnel diode and providing a conduction path for generation of said first signal only when said input transistors are all non-conducting.

7. A logic network as in claim 6 in which the emitter circuit of said emitter coupled transistor includes a capacitive means for producing during a brief period of charge transfer a current surge through said tunnel diode and reference transistor for driving said diode into said first stable state, which current becomes drastically reduced upon said capacitive means ceasing to transfer charge.

8. A logic network as in claim 7 wherein said first logic means includes at least two of said current mode operated logic gates.

9. A logic network as in claim 8 which includes output means coupled to said tunnel diode for generating a pair of complementary outputs that are in accordance with the state of said tunnel diode, said output means also acting as a buffer between said tunnel diode and said outputs.

References Cited

UNITED STATES PATENTS

| | | | |
|---|---|---|---|
| 3,078,376 | 2/1963 | Lewin | 307—206 |
| 3,211,925 | 10/1965 | Chow | 307—208 X |
| 3,277,289 | 10/1966 | Buelow et al. | 307—206 X |

DONALD D. FORRER, Primary Examiner

U.S. Cl. X.R.

307—206, 214, 215, 216, 218, 221, 238, 322